(12) United States Patent
Brenguer et al.

(10) Patent No.: US 6,759,023 B1
(45) Date of Patent: Jul. 6, 2004

(54) METHOD FOR MAKING A HYDRAZINE BY HYDROLYSING AN AZINE

(75) Inventors: Georges Brenguer, La Barthe de Neste (FR); Jean-Philippe Ricard, Pau (FR); Michel Vidal, Lannemezan (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/869,207

(22) PCT Filed: Nov. 12, 1999

(86) PCT No.: PCT/FR99/02786

§ 371 (c)(1), (2), (4) Date: Oct. 31, 2001

(87) PCT Pub. No.: WO00/37357

PCT Pub. Date: Jun. 29, 2000

(30) Foreign Application Priority Data

Dec. 22, 1998 (FR) .............................. 98 16257

(51) Int. Cl.[7] .............................. C01B 21/16

(52) U.S. Cl. ....................................... 423/407; 568/383
(58) Field of Search ........................... 423/407; 568/383

(56) References Cited

U.S. PATENT DOCUMENTS

| | | | |
|---|---|---|---|
| 3,481,701 A | * | 12/1969 | Otsuka et al. ............... 423/407 |
| 4,036,936 A | | 7/1977 | Yamaguchi et al. |
| 4,724,133 A | * | 2/1988 | Schirmann et al. ......... 423/407 |
| 4,725,421 A | | 2/1988 | Schirmann et al. |
| 5,393,508 A | | 2/1995 | Krempf et al. |
| 5,744,115 A | * | 4/1998 | Kuriyama et al. .......... 423/407 |
| 6,605,265 B1 | * | 8/2003 | Schirmann et al. ......... 423/407 |

FOREIGN PATENT DOCUMENTS

GB 1197743 7/1970

* cited by examiner

*Primary Examiner*—Wayne A. Langel

(57) ABSTRACT

The invention relates to a process for manufacturing hydrazine by hydrolyzing an azine, in which the heat required for the reaction and the separation by distillation of the components is partly provided by injecting vaporized water.

16 Claims, 2 Drawing Sheets

METHOD FOR MAKING A HYDRAZINE BY HYDROLYSING AN AZINE

DESCRIPTION

Figure 1:
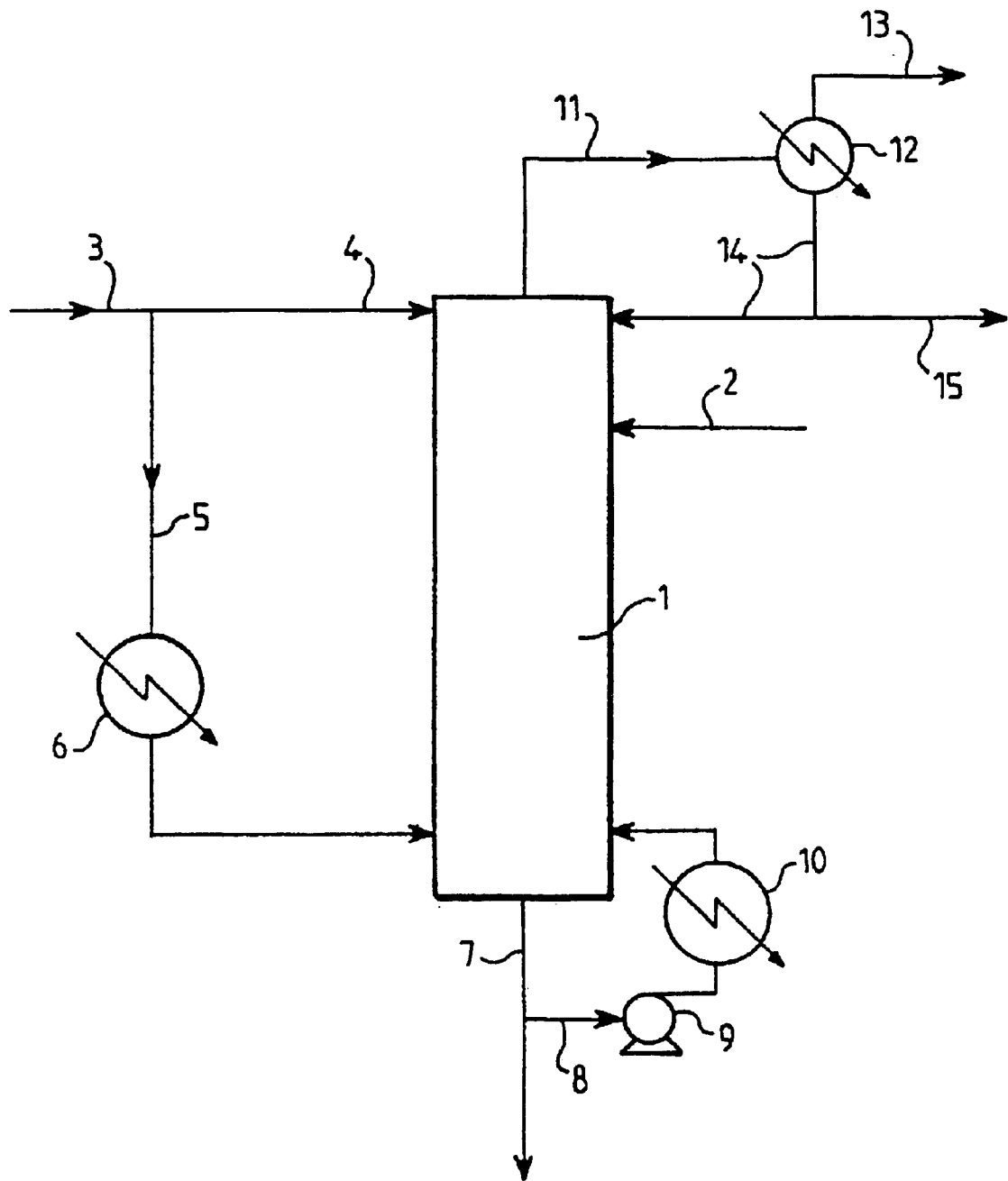

The present invention relates to an improved process for manufacturing hydrazine by hydrolysing an azine.

The industrial production of hydrazine is carried out according to the Raschig, Bayer or Atochem processes.

In the Raschig process, ammonia is oxidized with a hypochlorite to obtain a dilute hydrazine solution which must then be concentrated by distillation.

The Bayer process is a variant of the Raschig process, which consists in displacing a chemical equilibrium by trapping, using acetone, the hydrazine formed in the form of azine $(CH_3)_2C=N-N=C(CH_3)_2$. The azine is then isolated, after which it is hydrolysed to hydrazine.

The Atochem process consists in oxidizing a mixture of ammonia and methyl ethyl ketone with hydrogen peroxide in the presence of a catalyst to prepare the azine directly, which then simply requires hydrolysis to hydrazine. The Atochem process is described in many patents, for example U.S. Pat. Nos. 3,972,878, 3,972,876, 3,948,902 and 4,093,656.

The hydrolysis of an azine into hydrazine is described in the Schirmann et al., U.S. Pat. Nos. 4,724,133 and 4,725,421 and in GB patent 1,164,460.

This hydrolysis is carried out according to the standard reaction model, which makes it possible to go successively from the azine (I) to the corresponding hydrazone (II), and then from the hydrazone (II) to the hydrazine (III). For example, in the case of methyl ethyl ketone:

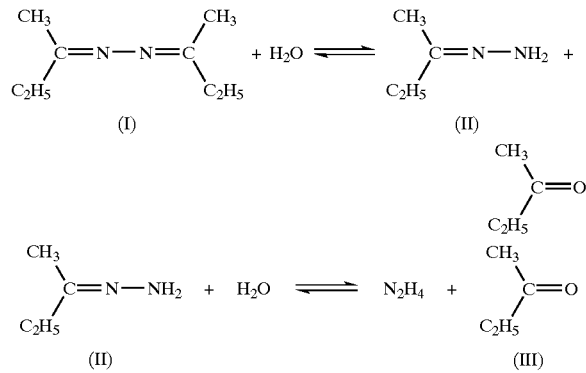

Since these two reactions are equilibrated, the equilibrium being very greatly displaced to the left, it is necessary to work under distilling conditions in order to remove the reaction products if it is desired to obtain hydrazine free of ketone.

This hydrolysis is thus carried out in a distillation column, the size of which is sufficient for it to be possible to install the two reaction zones as well as the depletion functions as regards the bottom of the column, and the concentration functions as regards the top of the column.

In practice, the column is fed with azine and water at the top. These hydrolysis reactions take place at a speed which is compatible with correct functioning of an industrial plant, only within a temperature range of greater than 140° C. and limited at the top to 185–190° C. on account of the instability of hydrazine at higher temperatures.

The two reactions described above are endothermic and it is necessary to supply the system with heat both for the reaction system and for maintaining the distilling conditions.

The principle of the distillation columns is based on the fact that, in general, all of the energy needs are supplied by means of a boiling vessel placed at the bottom of the column, which can be heated by various means, such as superheated steam, oil, heating fluid or electrical heating.

The Applicant has already observed that if a heat-siphon boiling vessel with a coil submerged at the bottom of the column or a tubular array mounted parallel to the bottom of the column is used, a phenomenon of decomposition of the hydrazine associated with, the high temperature of the metal wall is observed.

The Applicant has proposed, in European patent No. 0,431,998, a practical means for reducing this decomposition. It consists in particular ink working with a forced-circulation boiling vessel and using either titanium or chromium oxide as the material for the boiling vessel.

The Applicant has discovered that it is possible to further improve the yield for the process by minimizing the losses of hydrazine hydrate by decomposition, by means of using a boiling technique which is suited to the reaction and the components.

A subject of the invention is a process for manufacturing hydrazine by hydrolysing an azine, which is carried out in a column fed at the top with azine and water, and from which hydrazine is removed at the bottom and the ketone released is removed at the top, characterized in that the heat required for the reactions and the separation of the various components is partly supplied by means of a boiling vessel and partly by injection, into at least one point of the column, of vaporized water.

The decomposition of hydrazine at the bottom of the column takes place in the boiling vessel and occurs according to the following reactions:

Reaction (I) generally represents 95% of the decomposition.

The proposed solution makes it possible to greatly minimize the losses of hydrazine by injecting, into the bottom of the column, some of the water required to hydrolyse the azine, this water being in the form of vaporized water, which also supplies additional heat required for the separation by distillation. This makes it possible either to lower the temperature in the boiling vessel or to reduce the surface area and, in either case, to reduce the decomposition of the hydrazine.

The term "vaporized water" means water whose temperature is generally between 130 and 220° C. and whose relative pressure is between 3 and 18 bar.

The water introduced in the form of vaporized water represents between 20 and 80% and preferably between 40 and 60% of the total water.

This water may originate either from an external feed or from a recycling of the process water originating from the other steps of the overall process.

The choice of the precise characteristics of this vaporized water, as well as the amount used, naturally depends on the reaction carried out and the operating conditions of the column.

The vaporized water is generally injected into a single point, for reasons of simplicity, and this point is preferably located at the bottom of the column, and advantageously in a region in which the ratio of the "point of injection—highest point of column" and "point of injection—lowest point of column" distances is greater than or equal to 5/1.

In one variant of the process, there may be two or more points of injection, one of them, the one supplying more than 50/60% of the heat supplied in this form, being located at the bottom of the column.

The efficacy of the process is determined by the amount of hydrazine formed and decomposed, and this is done by measuring, at the column vents, the analytical composition of the effluent: nitrogen, ammonia, hydrogen. From this composition, the decomposition due to the reaction (I), volume of nitrogen, and to the reaction (II), volume of hydrogen, are deduced.

The process of the invention applies to a hydrolysis process using a conventional boiling vessel, by supplying heat at the bottom of the column. It is preferably used with the boiling method described in patent EP 0,431,998, in which, to heat the aqueous hydrazine solution essentially in liquid phase, the liquid phase is placed under pressure during the heating, i.e. the aqueous hydrazine solution absorbs heat energy in the form of an increase in its temperature, and this solution is then depressurized and the previous energy is yielded in the form of a vaporization, i.e. a forced-circulation boiling vessel is used.

The process of the invention applies to the hydrolysis of azines or homologous products such as hydrazone.

The terms "azine" and "hydrazone" respectively denote the products of formulae:

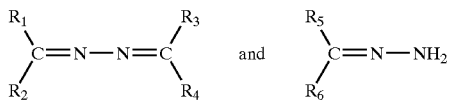

in which $R_1$ to $R_6$ are identical or different and denote hydrogen, a linear alkyl radical containing from 1 to 12 carbon atoms, a branched alkyl radical or a cycloalkyl radical containing from 3 to 12 carbon atoms, or an aryl radical containing from 6 to 12 carbon atoms. The radicals $R_1$ to $R_6$ connected to the same carbon atom of the azine or of the hydrazone can themselves be connected and can together represent a linear or branched alkylene radical containing from 3 to 12 carbon atoms.

All the above radicals $R_1$ to $R_6$ can also be substituted with a chlorine, a bromine, a fluorine or a nitro, hydroxyl or alkoxy group or an ester function. The invention is particularly useful for the acetone azine:

methyl ethyl ketazine

and the corresponding hydrazones.

Figure 2:
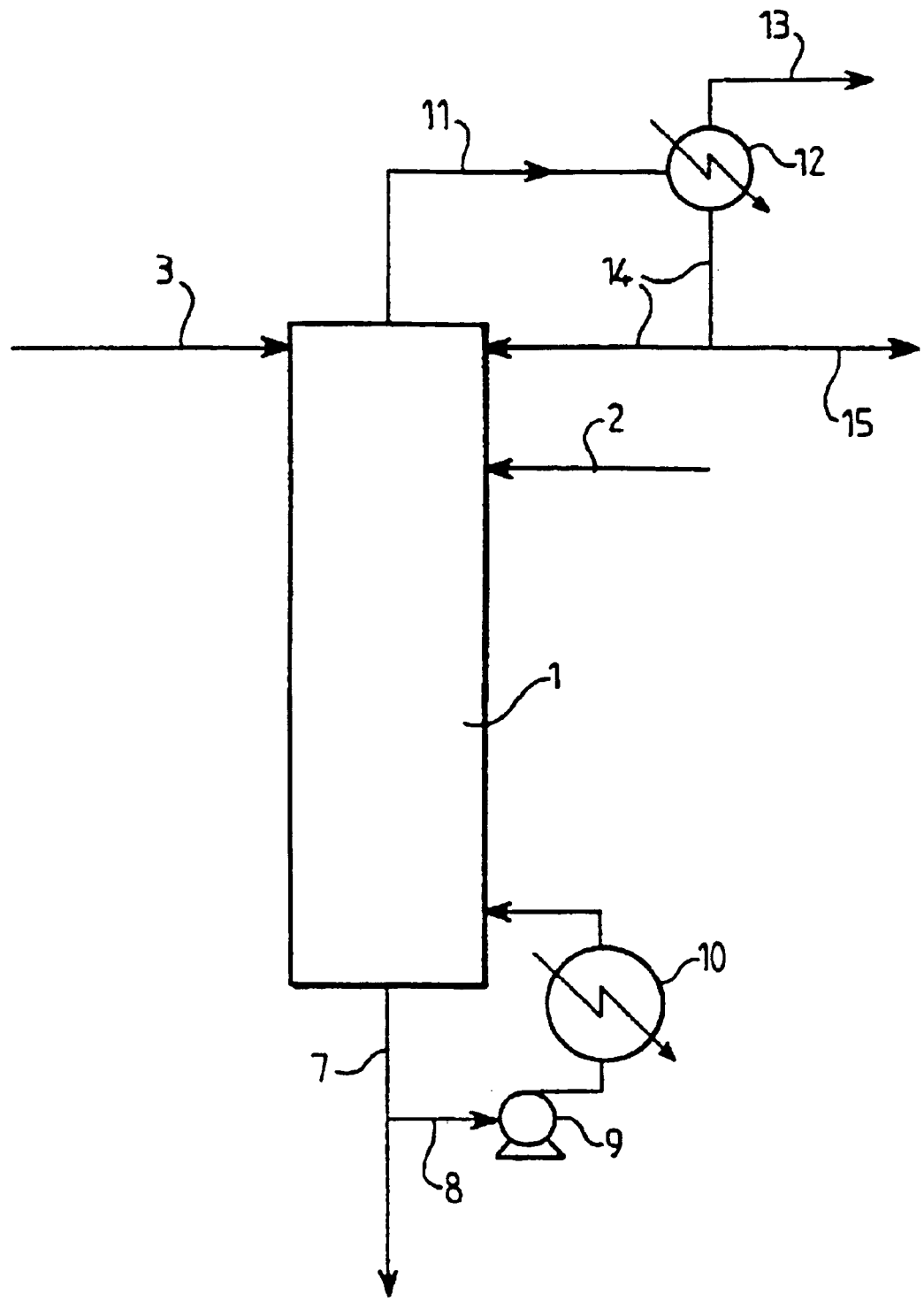

FIG. 1 describes a device for carrying out the process of the invention and FIG. 2 describes a device therefor of the prior art.

In FIG. 1, (1) represents a distillation column into which azine is introduced at the top of the column via the pipe (2) and water is introduced via the pipe (4). A fraction of the water supplied via the pipe (3) is sent via the pipe (5) to an exchanger (6) and then fed, in the form of vaporized water, into the bottom of the column (1). The hydrazine produced is removed from the bottom of the column via the pipe (7). A fraction of this hydrazine is deviated via the column and sent to a pump (9) and then to an exchanger (10) before being reinjected at a higher temperature into the bottom of the column (1). A ketone/water azeotrope and inert gases are removed from the top of the column (1) via the pipe (11) and are separated, after passage through an exchanger (12). The ketone/water azeotrope liquid fraction is partially recycled via the pipe (14) into the top of the column (1).

FIG. 2 illustrates the technique of the prior art, in which the water is introduced into the top of the column (1) via the pipe (3). The hydrazine formed is removed via the pipe (7) and partially recycled into the column (1) via the pipe (8) after passage through a pump (9) and an exchanger (10) which raise its temperature.

The process of the invention will be understood more clearly in the light of the examples below:

EXAMPLE 1

Mecazine (methyl ethyl azine) is hydrolysed in a plate column. The water and the mecazine are injected into the top of the column, and vaporised water is injected into the bottom of the column, as illustrated in FIG. 1. The operating conditions are as follows:

| | |
|---|---|
| Bottom temperature | 178–190° C. |
| Top pressure | 7.5 to 9.7 bar (relative) |
| Vaporised water injection | T: 180–195° C. |
| Boiling | T: 200° C. |
| | P: 16 bar |
| Azine injection | 4 t/h |
| Total water injection | 10.4 t/h |
| Vaporised water injection | 5 t/h |
| Removal of hydrazine | 9.1 t/h |
| (hydrazine hydrate expressed | |
| as HZH 14.6% - water 85.4%) | |
| Boiling | |
| Recycling flow rate | 17.7 t/h |
| Consumption of vapour | 330 t/h |
| Removal of ketone (azeotrope) | 5 t/h |
| (ketone 4 t/h; water 1 t/h) | |
| Nitrogen vents | 12.5 kg/h |

The amount of hydrazine, expressed as hydrazine hydrate, decomposed, measured according to the method described above, is 66.9 kg/hour, i.e. a loss of 4.8% of the hydrazine formed.

EXAMPLE 2-COMPARATIVE

The same reaction is carried out (see FIG. 2) in an identical column, the only differences being as follows:

all of the water is injected at the top;

the amount of removal for the boiling is 420 t/h and the corresponding consumption of vapour is 21.1 t/h instead of 330 t/h and 17.7 t/h, respectively.

The recovery of nitrogen in the vents is 19.4 kg/h instead of 12.5 kg/h.

The amount of hydrazine, expressed as hydrazine hydrate, decomposed is 104 kg/hour, i.e. 7.2% of the hydrazine hydrate formed.

The process of the invention makes it possible to reduce the decomposition of hydrazine in the reaction medium by 33%.

What is claimed is:

1. A process for manufacturing hydrazine comprising
providing a distillation column having a boiling vessel feeding azine and water to the top of the distillation column;

heating the azine and water in the column to hydrolyze the azine to produce hydrazine and ketone;

removing the hydrazine at a bottom of the column; and removing the ketone at the top of the column, wherein heat required for the hydrolyzing step and the removing steps is supplied by the boiling vessel and by injection of vaporized water into the column.

2. The process according to claim 1, characterized in that the vaporized water is injected into the bottom of the column.

3. The process according to claim 1, characterized in that the amount of water injected in the form of vaporized water represents from 20 to 80% by weight of the total water.

4. The process according to claim 1, characterized in that the vaporized water is at a temperature of between 130 and 220° C. and at relative pressure of between 3 and 18 bar.

5. The process according to claim 1, wherein the amount of water injected in the form of vaporized water represents from 40 to 60% of the total water.

6. The process according to claim 1, wherein the vaporized water is injected into the column at two or more points of the column.

7. The process according to claim 1, wherein the azine has the following formula:

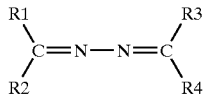

wherein R1 to R4 are identical or different and are hydrogen, a linear alkyl radical containing from 1 to 12 carbon atoms, a branched alkyl radical or a cycloalkyl radical containing from 3 to 12 carbon atoms, R1 and R2 and/or R3 and R4 may connect to each other and can together represent a linear or branched alkylene radical containing from 3 to 12 carbon atoms which constitutes a cycle containing from 4 to 13 carbon atoms including the carbon atom directly connected to nitrogen atom, R1 to R4 may be substituted with chlorine, bromine, fluorine, or nitro, hydroxy or alkoxy group or an ester function.

8. The process according to claim 7, wherein the azine is acetone azine or methyl ethyl ketazine.

9. The process according to claim 7, wherein the azine is acetone azine or methyl ethyl ketazine.

10. A process for manufacturing hydrazine, which comprises
feeding a distillation column having a boiling vessel with hydrazone and water at a top of the column;
heating the hydrazone and water in the column to hydrolyze the hydrazone to produce hydrazine and ketone;
removing the hydrazine at a bottom of the column; and
removing the ketone at the top of the column,
wherein heat required for the hydrolyzing step and the removing steps is supplied by the boiling vessel and by injection of vaporized water into the column.

11. The process 9 according to claim 10, characterized in that the vaporized water is injected into the bottom of the column.

12. The process according to claim 10, characterized in that the amount of water injected in the form of vaporized water represents from 20 to 80% by weight of the total water.

13. The process according to claim 10, characterized in that the vaporized water is at a temperature of between 130 and 220° C. and at relative pressure of between 3 and 18 bar.

14. The process according to claim 10, wherein the amount of water injected in the form of vaporized water represents from 40 to 60% of the total water.

15. The process according to claim 10, wherein the vaporized water is injected into the column at two or more points of the column.

16. The process according to claim 10, wherein the hydrazone has the following formula:

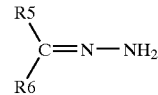

wherein R5 and R6 are identical or different and are hydrogen, a linear alkyl radical containing from 1 to 12 carbon atoms, a branched alkyl radical or a cycloalkyl radical containing from 3 to 12 carbon atoms, R5 and R6 may connect to each other and can together represent a linear or branched alkylene radical containing from 3 to 12 carbon atoms which constitutes a cycle containing from 4 to 13 carbon atoms including the carbon atom directly connected to nitrogen atom, R5 and R6 may be substituted with chlorine, bromine, fluorine, or nitro, hydroxy or alkoxy group or an ester function.

* * * * *